United States Patent [19]

Gauthier

[11] 4,422,244

[45] Dec. 27, 1983

[54] ELEVATION INDICATOR

[76] Inventor: Louis Gauthier, 115 Manning St., Hudson, Mass. 01749

[21] Appl. No.: 327,607

[22] Filed: Dec. 4, 1981

[51] Int. Cl.³ .................................... G01C 5/04
[52] U.S. Cl. ............................. 33/367; 73/432 HA
[58] Field of Search ........... 73/432 HA; 33/367, 376, 33/777; 116/278

[56] References Cited

U.S. PATENT DOCUMENTS

| 277,037 | 5/1883 | Le Grande | 33/209 |
| 914,945 | 3/1909 | Gutwein | 33/367 |
| 1,478,384 | 12/1923 | Dorsch | 116/278 |
| 1,488,749 | 4/1924 | Franz | 33/367 |
| 2,150,048 | 3/1939 | Boyd | 33/209 |
| 2,664,645 | 1/1954 | Qualman | 33/209 |
| 2,789,364 | 4/1957 | Selleck | 33/377 |
| 3,117,381 | 1/1964 | Durkin | 33/289 |
| 3,577,645 | 5/1971 | Zurawski | 33/209 |
| 3,849,898 | 11/1974 | Turloff | 33/367 |
| 4,041,613 | 8/1977 | Bishop | 33/367 |
| 4,161,069 | 7/1979 | Cubeta | 33/367 |

Primary Examiner—S. Clement Swisher
Attorney, Agent, or Firm—Blodgett & Blodgett

[57] ABSTRACT

An elevation indicator comprising a supporting base, a reservoir for holding liquid supported on the base, an elongated staff and a flexible tube extending from the staff to the reservoir. An elongated scale is mounted on the staff for longitudinal movement relative to the staff and a transparent tube is also mounted on the staff and extends along one side of the staff adjacent the scale. A check valve is located at the top of the transparent tube and the bottom of the transparent tube is connected to the flexible tube, so that liquid can flow between the reservoir and the transparent tube.

8 Claims, 7 Drawing Figures

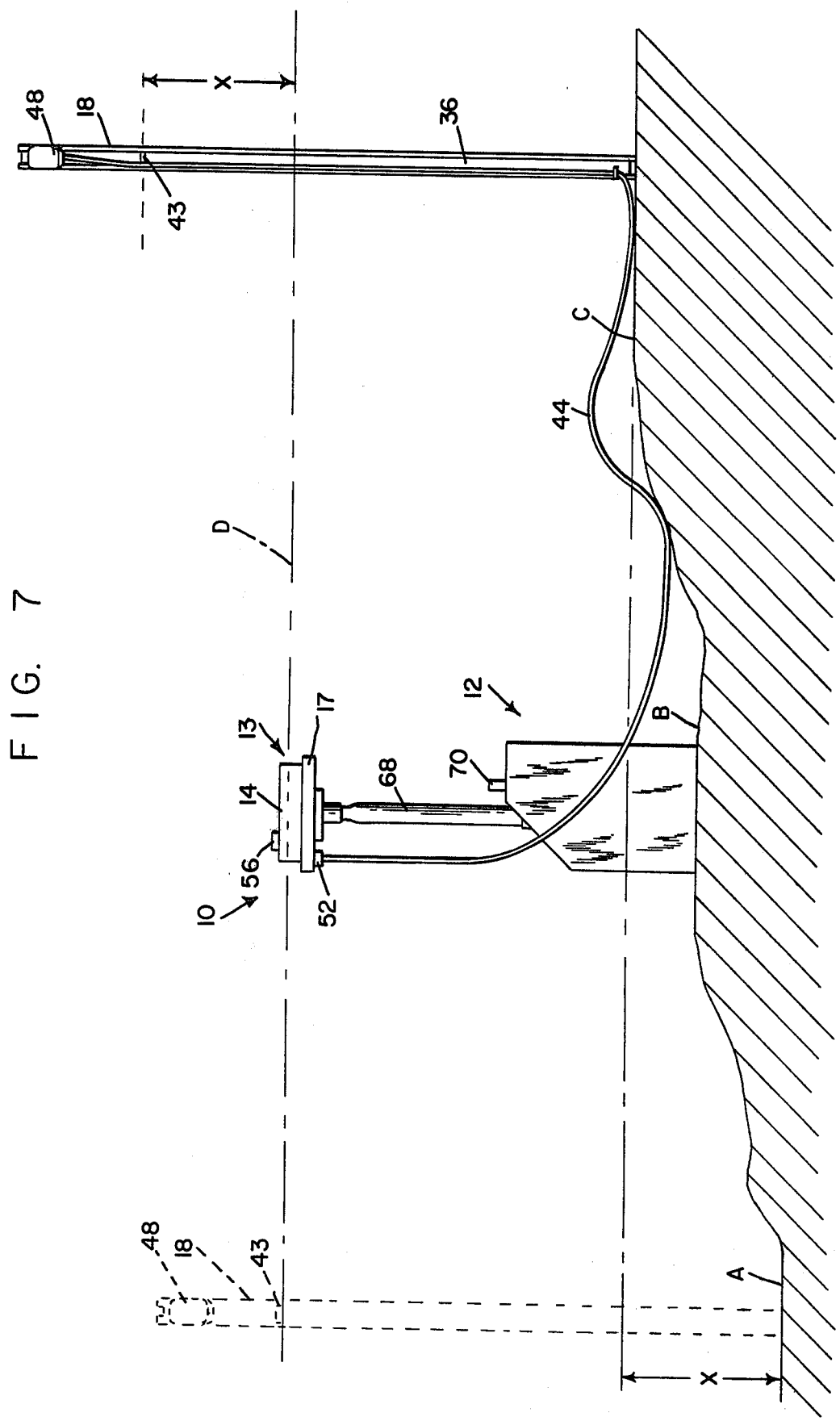

ELEVATION INDICATOR

BACKGROUND OF THE INVENTION

This invention relates generally to apparatus for measuring the elevations of land structures and the like, for the use of architects, builders, engineers, surveyors, construction workers, farmers and other persons whose jobs require an accurate elevaton-indicating instrument at a reasonable cost.

The invention is particularly directed to an elevation indicator which makes use of liquid and comprises a reservoir for containing the liquid and supported at a base elevation, a staff provided with a scale and clear tube, extending along the scale, and a flexible tube extending from the reservoir to the clear tube on the staff. Liquid flows from the reservoir to the clear tube through the flexible tube, so that the water level in the clear tube is the same as the water level in the reservoir. The liquid level in the clear tube is defined by the meniscus. The top of the reservoir and the top of the clear tube are generally vented to prevent an air lock at either end of the system and to allow the meniscus in the clear tube to move freely relative to the clear tube as it maintains the same level as the level of liquid in the reservoir.

One difficulty encountered with prior art devices is that elevation readings and settings are generally difficult to obtain because the devices only give a level point. In most cases, a measurement must then be subtracted or added in order to obtain an elevation measurement between two different points. However, in the case of levels in which the clear tube is moved relative to the staff, readings are difficult to obtain because of the bouncing of the meniscus as it is moved vertically. The device cannot be read accurately until the meniscus is allowed to settle down after movement. In at least one case where a scale was used on the staff, it was necessary to use a non-standard, calibrated scale. In addition, all of these solutions add greatly to the cost and complexity of the indicator. These and other difficulties experienced with the prior art elevation indicators have been obviated in a novel manner by the present invention.

It is, therefore, an outstanding object of the invention to provide an elevation indicator which is reliable and easy to use.

Another object of this invention is the provision of an elevation indicator in which the meniscus in the clear tube on the measuring staff moves freely, so that it reaches the level of the reservoir quickly and accurately without danger of loosing fluid from the system.

A further object of the present invention is the provision of an elevation indicator, in which elevation readings can be taken directly from the scale on the measuring staff.

It is another object of the instant invention to provide an elevation indicator, in which the measuring staff has an adjustable scale which is easy to use, and which maintains its accuracy over an extended period of use.

A still further object of the invention is the provision of an elevation indicator capable of measuring a greatly increased range of elevation, without changing the location of the reservoir.

It is a further object of the invention to provide an elevation indicator, having a support for the reservoir which also functions as a carrying case for various elements of the indicator.

It is a still further object of the invention to provide an elevation indicator which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of an elevation indicator having a reservoir for holding a quantity of liquid and supported on a base, a measuring staff, and a flexible tube operatively connecting the reservoir to the measuring staff. The surface area of the reservoir has a specific, selected ratio to the area of the cross-section of the tube, the ratio being very large. The measuring staff is provided with a measuring scale mounted on the staff of longitudinal movement relative to the staff and with a transparent tube extending along one side of the staff adjacent the scale. A check valve is carried at the top of the transparent tube. The flexible tube is connected to a bottom opening of the reservoir and is connected to the transparent tube, so that liquid can flow between the reservoir and the transparent tube. The invention also consists of an elevation indicator which includes a measuring staff, having a scale which is mounted on the staff for a longitudinal movement relative to the staff along a flattened loop from a first end of the tape and the back side of the staff over the top of the staff, down the front side and under the bottom of the staff to a second end of the tape at the back side of the staff. The first and second ends of the tape are spaced and are connected by a tension spring.

More specifically, the clear tube on the measuring staff and the flexible tube, extending between the reservoir and the measuring staff is a single continuous tube and there is a fixture at the top of the staff for supporting the end of this tube. The supporting means for the reservoir includes a downardly-extending post from the reservoir, a box having an upperly-extending post from the bottom wall, thereof, and an extension which is attachable to each of the posts for supporting the reservoir above the box. The box is also adapted for storing the reservoir, extension and flexible tube.

BRIEF DESCRIPTION OF THE DRAWINGS

The character of the invention, however, may be best understood by reference to one of its structural forms, as illustrated by the accompanying drawings, in which:

FIG. 7 is a diagramatic view of the elevation indicator showing one way in which the indicator can be used to measure a difference in elevation between two points.

DESCRIPTION OF THE PREFERRED EMBODIMENT

Figure 1:
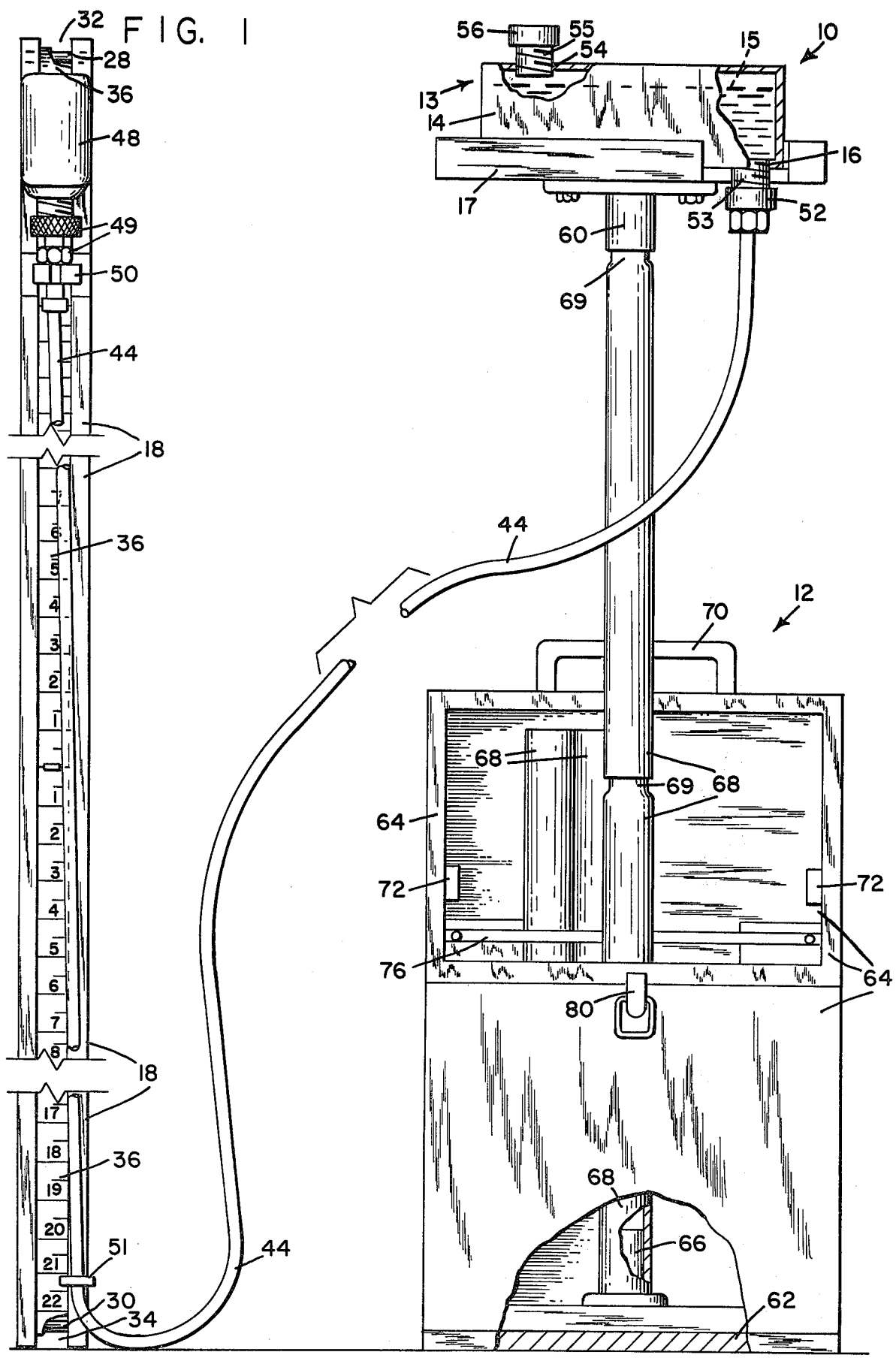
FIG. 1 is a front-elevational view of the elevation indicator, embodying the principles of the present invention.

Referring first to FIGS. 1-4, which best show the general features of the invention, the elevation indicator, generally indicated by the reference numeral 10, includes a supporting base 12, a reservoir 13, and a measuring staff 18. The reservoir 13 includes a watertight housing 14 mounted in a tray 17. The housing 14 contains a colored liquid 15 and has a bottom opening 16.

Figure 3:
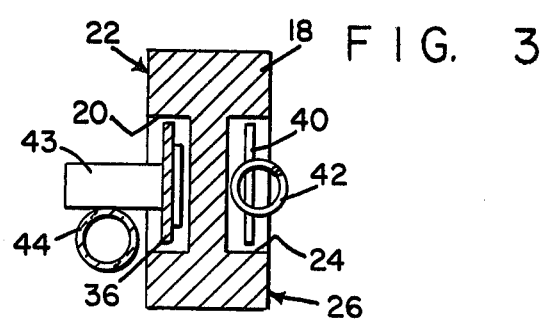
FIG. 3 is a horizontal, cross-sectional view of the measuring staff taken along the line III—III of FIG. 2.
Figure 2:
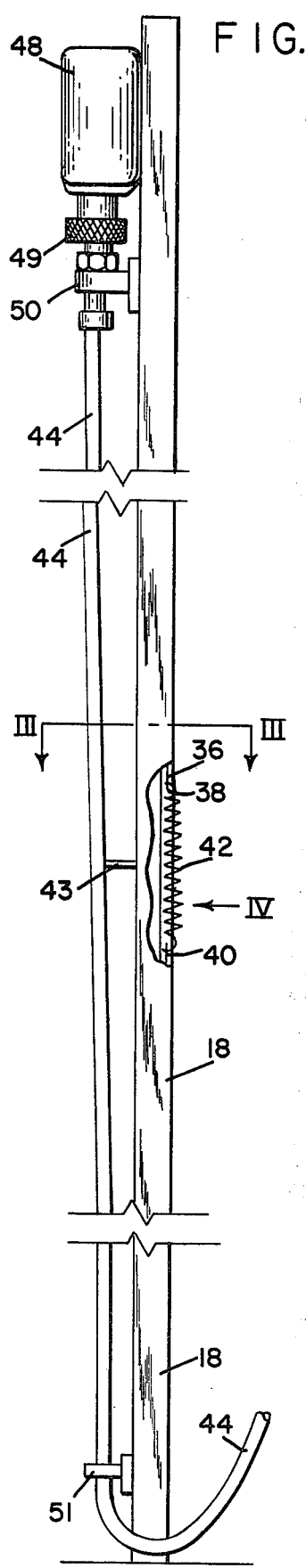
FIG. 2 is a side-elevational view of the measuring staff.
Figure 4:
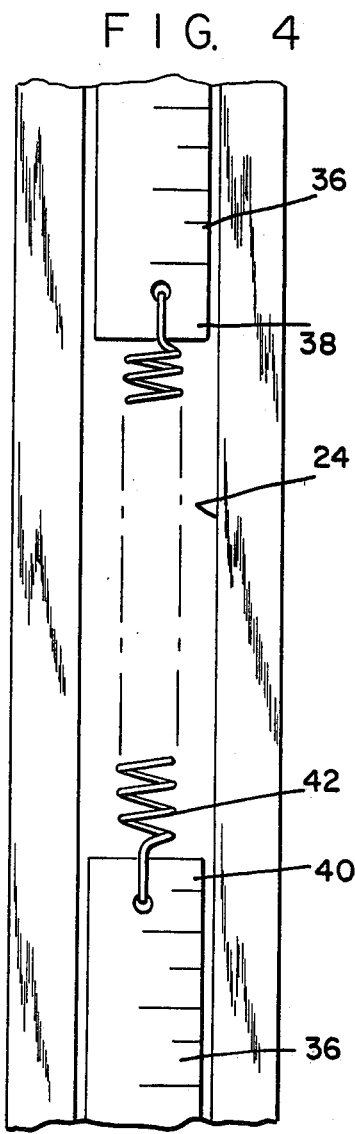
FIG. 4 is a fragmentary rear-elevational view of the measuring staff, looking in the direction of arrow IV of FIG. 2.

The staff 18 is elongated, as shown in FIGS. 1 and 2, and has an H-shaped cross section, as viewed in FIG. 3, which defines a groove 20 along the front face 22 of the staff and a groove 24 along the back face 26 of the staff. The top and bottom of the staff is provided with upper and lower rollers 28 and 30, respectively, which are rotatably mounted in the staff. The rollers 28 and 30 form upper and lower grooves 32 and 34, respectively, which connect the front and back grooves 20 and 24, respectively. A flexible flat scale 36 is located in the grooves of the staff in a flattened loop which begins from a first end 38 of the tape in the rear groove 24 over the upper roller 28, down along the front side 22 of the staff in the front groove 20, under the bottom roller 30 to a second end 40 of the tape in the rear groove 24. The second end 40 is spaced from the first end 38. A tension spring 42 extends from the first end 38 to the second end 40 to maintain the measuring tape 36 under tension on the rollers 28 and 30. The tape 36 can be moved longitudinally along the grooves of the staff by means of a finger tab 43 which projects forwardly from the face of the tape.

Figure 5:
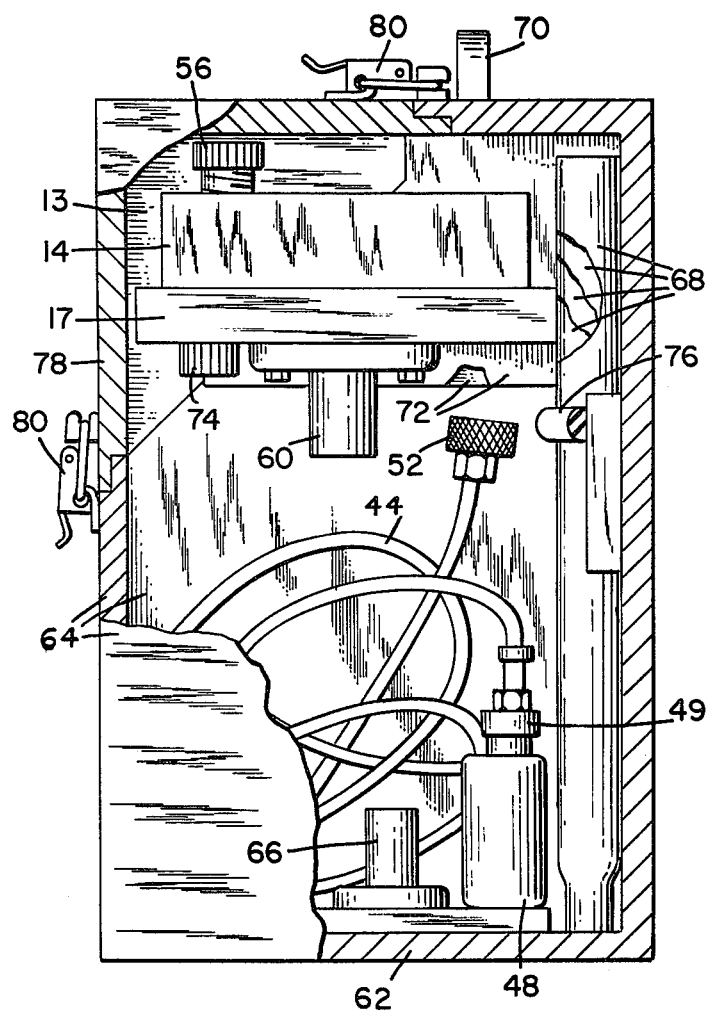
FIG. 5 is a side-elevational view of the supporting means for the reservoir, with portions broken away to show the manner in which the supporting means also functions as a carrying case for various elements of the elevation indicator.

A flexible transparent plastic tube 44 is mounted on the staff 18 in such a manner that it extends along the scale 36. The top of the tube 44 is connected to a checkvalve 48 by means of a plumbing fixture 49 supported on the staff 18 by means of a spring clamp 50. The tube 44 extends down to the bottom of the staff 18, to a guide 51 and is connected to a plumbing fixture 52. The plumbing fixture 52 is threaded onto a nipple 53 which extends from the opening 16, so that the liquid 15 in the reservoir can flow into the tube 44. In the preferred embodiment, the surface area of the liquid in the reservoir is in the ratio of 1200-to-1 to the area of the cross-section of the tube, this confirming the reading error to approximately 0.08%. The reservoir housing 14 has a top opening 54. A threaded nipple 55 extends from the top opening 54 and is closed by a filling cap 54. The bottom of the tray 17 is provided with a downwardly-extending post 60. The supporting base 12 is provided with a box-like structure having sidewalls 64 and a bottom wall 62 which supports an upwardly-extending post 66. Tubular extension elements 68 are engageable with the posts 60 and 66 and enable the reservoir 13 to be supported above the box-like structure of the supporting base 12. Each supporting element 68 has a reduced end 69 which fits into the opposite end of another supporting element or into the downwardly-extending post 60, as shown in FIG. 1. Additional extension elements 68 are stored at the back of the box-like structure and held in place by means of a flexible strap 76. These additional extension elements 68 enable the height of the reservoir 13 to be increased relative to the supporting base. This increased the elevation range of the indicating device without the need for moving the supporting base, as will be explained more fully hereinbelow. The supporting base 12 also serves as a carrying case for most of the elements of the elevation indicator, as particularly shown in FIG. 5. Guide elements 72 are located on the inside surface of two of the opposite sidewalls 64 of the supporting base 12 for holding the tray 17 of the reservoir 13, as shown in FIG. 5. The supporting base 12 also includes a carrying handle 70 and a removable cover 78, which is attachable to the supporting base by means of latches 80.

Figure 6:
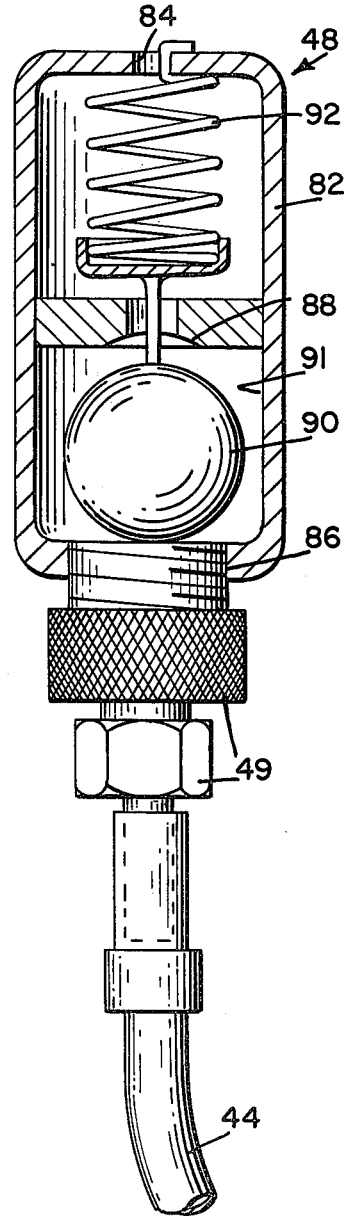
FIG. 6 is a vertical cross-sectional view of the check valve, at the top of the clear tube on the measuring staff.

Referring particularly to FIG. 6, the check valve 48 includes a housing 82 having a top opening 84 and a bottom opening 86 adapted to receive the plumbing fixture 49. A valve seat 88 is located between the top and bottom openings 84 and 86, respectively, and a ball 90 is located between the valve seat 88 and the bottom opening 86. A spring 92 maintains the ball in a centered position. The ball 90 has a very low density and is capable of floating in the liquid 15, so that as the space 91 between the ball valve 88 and the bottom opening 86 fills with liquid, the ball 90 is carried upwardly by the liquid until it engages the seat 88 in sealing relationship.

The operation and advantages of the present invention will now be readily understood in view of the above description. To begin with, the elevation indicator 10 is carried to a location from which elevation measurements are to be made with most of the elements located in the box-like supporting base 12 as shown in FIG. 5. The staff 18 (without the flexible tube 44) and the valve 48 are carried separately. When arriving at the measuring site, the latches 80 are opened and the cover 78 is removed. All of the contents within the box-like structure including two of the extension elements 68 are removed. The two extension elements 68 are mounted on the bottom post 66. The reservoir 13 is tipped upside down, so that the opening 16 is in an uppermost position and the fixture 52 is connected to the nipple 53. The opposite end of the flexible tube 44, carrying the check valve 48, is attached to the staff 18 in the manner shown in FIG. 1. The filling cap 56 is removed from the nipple 55 to allow liquid to flow through the tube. The reservoir 13 is then mounted on the uppermost extension 68, as shown in FIG. 1. The elevation indicator 10 is now ready to be used for measuring the difference in elevation between two points, as illustrated more clearly in FIG. 7.

Referring particularly to FIG. 7, the supporting base 12 is placed on the ground at a base level B so that the level of the liquid 15 in the reservoir lies within a horizontal plane D. The staff 18 is moved to location A as shown by dotted lines in FIG. 7, so that the bottom of the staff rests on the ground at this location. The scale 36 is shifted vertically relative to the staff 18 by grasping the finger tab 43 and moving it to the meniscus point in the portion of the tube 44, which extends along the staff 18. This point is located at the level D, as viewed in FIG. 7. The finger tab 43 is located at the zero mark on the scale 36 and the scale reads in both directions from this zero mark, as shown in FIG. 1. In this way, readings can be taken directly from the scale 36 for measuring a drop in elevation, as well as a rise in elevation. In the example shown in FIG. 7, the meniscus and the finger tab are located in the upper portion of the staff 18, since the point A is a lower elevation than the base point B. Staff 18 is then moved to the elevation point C which is to be compared with the point A, as shown by full lines in FIG. 7. Since the meniscus point in the tube 44, which extends along the staff 18, remains at the reservoir level D, the meniscus is located below at the zero point at the tab 43 by an amount equal to the difference in elevation between points A and C. This difference in elevation is represented by the letter X and can be read directly from the scale 36. The scale 36 can then be reset by moving the finger tab downwardly, so that the zero point on the scale is again aligned with the meniscus at the level D. The staff 18 can then be moved to a third point for measuring the difference in the elevation between the third point and the point C. In this way, continuous measurements in elevation can be made by repeating the procedure described above. Each new point is compared with the previous point by reading the difference in elevation directly from the scale and recording this value for each reading. In the event that a point to be measured is located above the level D, so that the meniscus drops to the bottom of the scale, the supporting base 12 is adjusted upwardly by adding another extension element 68. This raises the liquid level in the reservoir 13, an amount approximately equal to the length of the extension element 68. In the event that subsequent points to be measured are lower, the reservoir 13 can be lowered by removing extension elements 68 as necessary. The ability to adjust the reservoir level D enables the operator to take elevation readings for a considerable range of elevation without moving the supporting base 12 from the base location B. However, there are times when the supporting base 12 must be moved due to the limited length of the tube 44 or if the points to be measured vary too greatly in elevation from the base point B. This has no adverse affect on the measurements to be taken, since each measurement is compared to the previous measurement. The supporting base 12 is simply moved to the last point to be measured and the procedure described above is again repeated.

After all the necessary recordings have been made by the elevation indicator 10 of the present invention, the tube 44 and valve 48 are disconnected from the staff 18, the reservoir 13 is removed from the extension element 68 and turned so that the bottom opening 16 faces horizontally. The liquid in the tube 44 is then drained back into the reservoir housing 14 and a closure cap 74 is applied to the threaded nipple 53. As shown in FIG. 7, the bottom opening 16 and a top opening 54 are located near the same side of the reservoir housing 14. In this way, the reservoir 13 can be tipped so that the top and bottom openings 54 and 16, respectively, are above the water level in the housing 14. The closure cap 56 for the upper opening 54 can thereby be left off, so that the liquid can be drained easily from the tube 54 back into the reservoir. The closure cap 56 is then applied to the nipple 55 to seal the upper opening 54. The plumbing fixture 52 is removed from the nipple 53 and the closure cap 74 is applied thereto. As shown in FIG. 5, the extension elements 68 are stored at the back of the box-like structure of the supporting base 12 behind the flexible strap 76. The flexible tube 44 and valve 48 are then placed in the bottom of the box and the reservoir 13 is placed into the box, so that the tray 17 rests on the guide 72, as shown in FIG. 5. The cover 78 is then applied to the box, so that it covers the reservoir 13 and is locked into place by closing the latches 80. The entire assembly can then be transported by grasping the carrying handle 70.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Elevation indicator, comprising:
   (a) a supporting base,
   (b) a reservoir for holding a quantity of liquid and supported on the base, said reservoir having a bottom opening,
   (c) an elongated staff,
   (d) an elongated scale mounted on the staff for longitudinal movement relative to the staff,
   (e) a transparent tube mounted on the staff and extending along one side of the staff adjacent the scale,
   (f) a flexible tube operatively connecting the bottom opening of the reservoir to the bottom of the transparent tube, so that liquid can flow from the reservoir to the transparent tube,
   (g) a check valve comprising:
      (1) a housing having a top opening and a bottom opening which is operatively connected to the top of the transparent tube,
      (2) a partition between said top and bottom openings for dividing said housing into an upper chamber and a lower chamber, said partition having an opening extending between said chambers and a valve seat facing said lower chamber, and
      (3) a ball located in said lower chamber between said bottom opening and the valve seat, said ball being capable of floating in the liquid which is in the reservoir so that when said lower chamber is filled with said liquid, the ball will rise into sealing engagement with the valve seat.

2. Elevation indicator, comprising:
   (a) a supporting base,
   (b) a reservoir for holding a quantity of liquid and having a bottom opening,
   (c) an adjustable support comprises a plurality of disconnectable extension elements for supporting the reservoir and for varying the hieght of the reservoir,
   (d) an elongated staff,
   (e) an elongated scale mounted on the staff for longitudinal movement relative to the staff,
   (f) a transparent movement relative to the staff and extending along one side of the staff adjacent the scale,
   (g) a check valve at the top of the tube, and
   (h) a flexible tube operatively connecting the bottom opening of the reservoir to the bottom of the transparent tube, so that liquid can flow from the reservoir to the transparent tube.

3. Elevation indicator as recited in claim 2, wherein the reservoir has a top opening and there is a filling cap for sealing the top opening.

4. Elevation indicator as recited in claim 2, wherein the transparent tube and the flexible tube is a single continuous tube and there is a fixture at the top of the staff for supporting the end of the tube which is attached to the check valve.

5. Elevation indicator as recited in claim 4, wherein a guide is located at the lower end of the staff for maintaining the tube in longitudinal alignment with the staff.

6. Elevation indicator, comprising:
   (a) a reservoir for holding a quantity of liquid, said reservoir having a bottom wall, a bottom opening in said bottom wall, and a downwardly extending post from said bottom wall,
   (b) a supporting base comprising:
      1. a box having a bottom wall, side walls and a removable cover, the bottom wall having an upwardly-extending post, and
      2. an extension which is attachable to each of said posts for supporting the reservoir above the box, said box being adapted for storing the reservoir, extension and flexible tube,
   (c) an elongated staff,
   (d) an elongated scale mounted on the staff for longitudinal movement relative to the staff,
   (e) a transparent tube mounted on the staff and extending along one side of the staff adjacent the scale,
   (f) a check valve at the top of the tube, and
   (g) a flexible tube operatively connecting the bottom opening of the reservoir to the bottom of the transparent tube, so that liquid can flow from the reservoir to the transparent tube.

7. Elevation indicator as recited in claim 6, wherein two opposite side walls of the box are provided with guides for supporting the reservoir.

8. Elevation indicator as recited in claim 7, wherein the box comprises:
   (a) a carrying handle, and
   (b) latch means for releasably attaching the cover to the box.

* * * * *